United States Patent [19]

Deerfield et al.

[11] 3,794,984

[45] Feb. 26, 1974

[54] ARRAY PROCESSOR FOR DIGITAL COMPUTERS

[75] Inventors: Alan J. Deerfield, Newtonville; Stanley M. Nissen, Billerica, both of Mass.

[73] Assignee: Raytheon Company, Lexington, Mass.

[22] Filed: Oct. 14, 1971

[21] Appl. No.: 189,291

[52] U.S. Cl. .............................................. 340/172.5

[51] Int. Cl. ......... G06f 7/00, G06f 7/38, G06f 9/00

[58] Field of Search ...... 340/172.5, 146.3 MA, 166; 324/77

[56] References Cited

UNITED STATES PATENTS

| | | | |
|---|---|---|---|
| 3,440,611 | 4/1969 | Salkoff et al. | 340/172.5 |
| 3,537,074 | 10/1970 | Tokes et al. | 340/172.5 |
| 3,544,973 | 12/1970 | Borck et al. | 340/172.5 |
| 3,560,934 | 2/1971 | Ernst et al. | 340/172.5 |
| 3,573,851 | 4/1971 | Watson et al. | 340/172.5 |
| 3,611,309 | 10/1971 | Zingg | 340/172.5 |
| 3,297,993 | 1/1967 | Clapper | 340/172.5 |
| 3,350,693 | 10/1967 | Foulger et al. | 340/172.5 |
| 3,368,202 | 2/1968 | Crousel | 340/172.5 |
| 3,391,390 | 7/1968 | Crane et al. | 340/172.5 |
| 3,510,847 | 5/1970 | Carlson et al. | 340/172.5 |
| 3,535,694 | 10/1970 | Anacker et al. | 340/172.5 |
| 3,541,516 | 11/1970 | Senzig | 340/172.5 |

*Primary Examiner*—Gareth D. Shaw
*Assistant Examiner*—James D. Thomas
*Attorney, Agent, or Firm*—Philip J. McFarland; Joseph D. Pannone

[57] ABSTRACT

A digital computer adapted to perform vector and matrix operations without detailed programs is disclosed. The dimensions of matrices or of vectors are entered as codes in reserved fields in successive instruction words and the computer's processor is made to be responsive to such codes to perform any required operations on the matrices or vectors to be processed.

6 Claims, 3 Drawing Figures

ARRAY PROCESSOR FOR DIGITAL COMPUTERS

The invention herein described was made in the course of or under a contract or subcontract thereunder with the Department of Defense.

BACKGROUND OF THE INVENTION

This invention pertains generally to digital computers and particularly to general purpose digital computers adapted to perform operations on arrays, such as vectors or matrices.

It is known in the art that a general purpose digital computer may be programmed to process vectors. Thus, it is known to process vectors in a so-called "element-by-element" manner so that corresponding elements of a pair of vectors may be used to derive a desired answer, as the vector sum or difference of the vectors in a given pair.

It is also known to process matrices, as by multiplying elements in a given order, in such a manner as to produce a resultant matrix, sometimes referred to as an "inner product." Still further, it is known to process two, or more, vectors in such a manner as to produce a matrix, sometimes referred to as an "outer product."

In every case the processing requires at least that a first set of operands (representing either a vector or a matrix) be combined in a particular fashion with a second set of operands (also representing either a vector or a matrix). The practical problem encountered is that the conventional computer is not adapted to operate with a "shorthand" notatio of the particular vectors or matrices being processed. Therefore, it is necessary with conventional computers to provide a detailed program to the processor therein so that that part of the computer may execute the required arithmetic processes in correct order. Unfortunately, the necessary detail in the program may be obtained only as the result of a large amount of work either by the user of the computer or at the price of providing a relatively expensive and slow working compiler.

There have been attempts made to simplify vector and matrix processing in a ditigal computer. Thus, for example, the so-called "STAR" computer was developed to perform, inter alia, the element by element operations required for processing vector quantities. In that computer, the individual elements making up two vectors to be processed are stored in separate memories in such a manner that the elements may be retrieved from memory in proper order and applied simultaneously to an arithmetic unit. While such an approach may be used to process vector quantities, matrices may not be processed in such a manner. Therefore, when it is desired to process matrices without providing a detailed program, itis known to use a higher order language containing matrix code symbols, each of which serves as a shorthand notation of a particular matrix and operation. When any such symbol is introduced to a compiler of proper character, the symbol causes the compiler to retrieve the "step-by-step" program required for the desired processing from an associated memory. While such an approach relieves the user of the task of writing a detailed program, it still is relatively inefficient in that any "step-by-step" program requires many ancillary instructions for use during processing to maintain the proper order in which processing is accomplished.

SUMMARY OF THE INVENTION

Therefore, it is a primary object of this invention to provide an improved digital computer which is adapted to process vector quantities or matrices in the most efficient manner possible.

Another object of this invention is to provide an improved digital computer containing a processor which may be controlled to process vector quantities and matrices without the necessity of compilation before processing.

Still another object of this invention is to provide an improved digital computer which is particularly well adapted to matrix multiplication.

These and other objects of this invention are attained generally by providing a digital computer whose processor is responsive to an instruction word containing, in addition to operation and operand address codes, array dimension codes. The processor is arranged so as to store, in response to the operand address code and the array dimension code in a first instruction word, the elements of an array to be processed and operation codes associated therewith and then, in response to the array dimension, the operation and operand address codes in a second instruction word, to combine, in the manner determined by the codes, the elements of a second array with the elements of the stored array. The processor also compiles the elements of the two arrays so that elements are sequentially selected in proper order for the particular processing being accomplished.

BRIEF DESCRIPTION OF THE DRAWINGS

For a more complete understanding of this invention reference is now made to the following description of the drawing in which.

Before referring to the FIGS. in detail, it should be noted that all of the Figures have been simplified in order to avoid masking the concepts of this invention with details which, although necessary in a working computer, are unnecessary to an understanding of the concepts of this invention. For example, it has been chosen to show two interlaced trains of clock pulses for loading and transferring digital information from element to element. Further, elements for generating control signals, such as "routine complete" signals in the arithmetic units so that digital information may be gated into the processor in proper sequence, are now shown. It is felt that such details, being well known in the art, are not necessary to an understanding of the inventive concepts.

DESCRIPTION OF THE PREFERRED EMBODIMENTS

Figure 1:
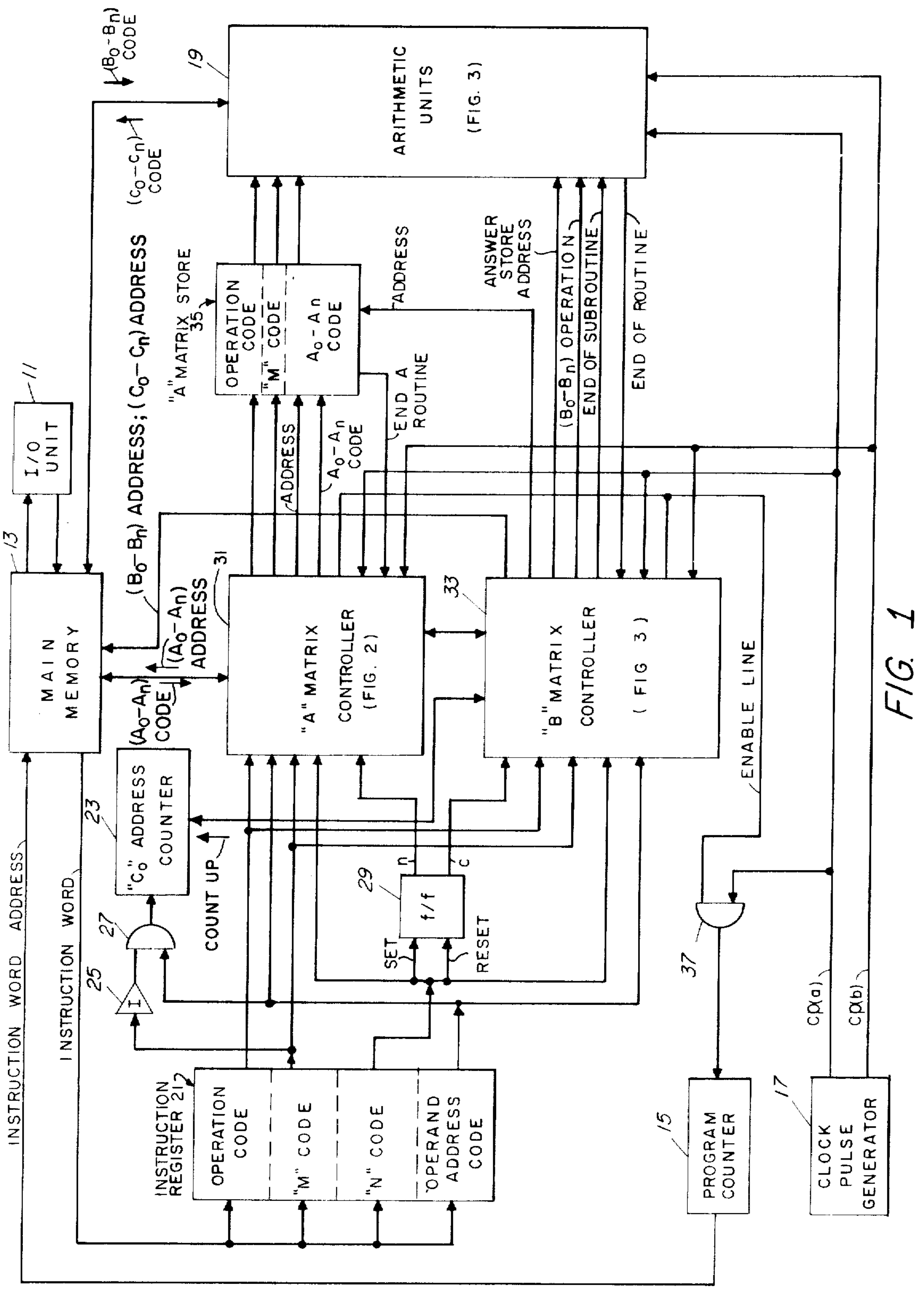
FIG. 1 is a diagram of a digital computer, such diagram showing in particular the relationship of a contemplated processor to the remaining essential portions of such a computer.

Referring now to FIG. 1 it may be seen that the architecture of a computer according to this invention is quite similar to the architecture of a conventional general purpose computer. That is, the contemplated computer includes an input/output unit 11, a main memory 13, a program counter 15 and a clock pulse generator 17 and arithmetic units 19 to be described. Thus, each time the program counter 15 is actuated by a clock pulse, c.p.(a) a word is transferred from the main memory 13 to an instruction register 21 to initiate the routines to be described. Each instruction word is conventional in that each one contains an operation code field and an operand address code field. In addition, however, according to this invention each instruction word contains a field for a so-called "M code" and a field for a so-called "N code" (where "M" and "N" indicate dimensions of matrices to be processed as discussed hereinafter). Suffice it to say here, that, unless matrix or vector processing is to be performed, the "M" and the "N" code fields are empty, i.e. "zero". The operand address in any instruction word with an empty "M" code field, when loaded into instruction register 21, serves to set a "$C_0$ address counter 23 by reason of the operation of an inverter 25 and an AND gate 27. The contents of the "$C_0$" address counter 23 is the address in the main memory 13 at which the first partial result of the processing to be described will be stored. The fact that the contents of the "$C_0$" address counter 23 changes whenever an instruction word not connected with vector or matrix processing is immaterial for reasons which will become clear hereinafter.

Figure 2:
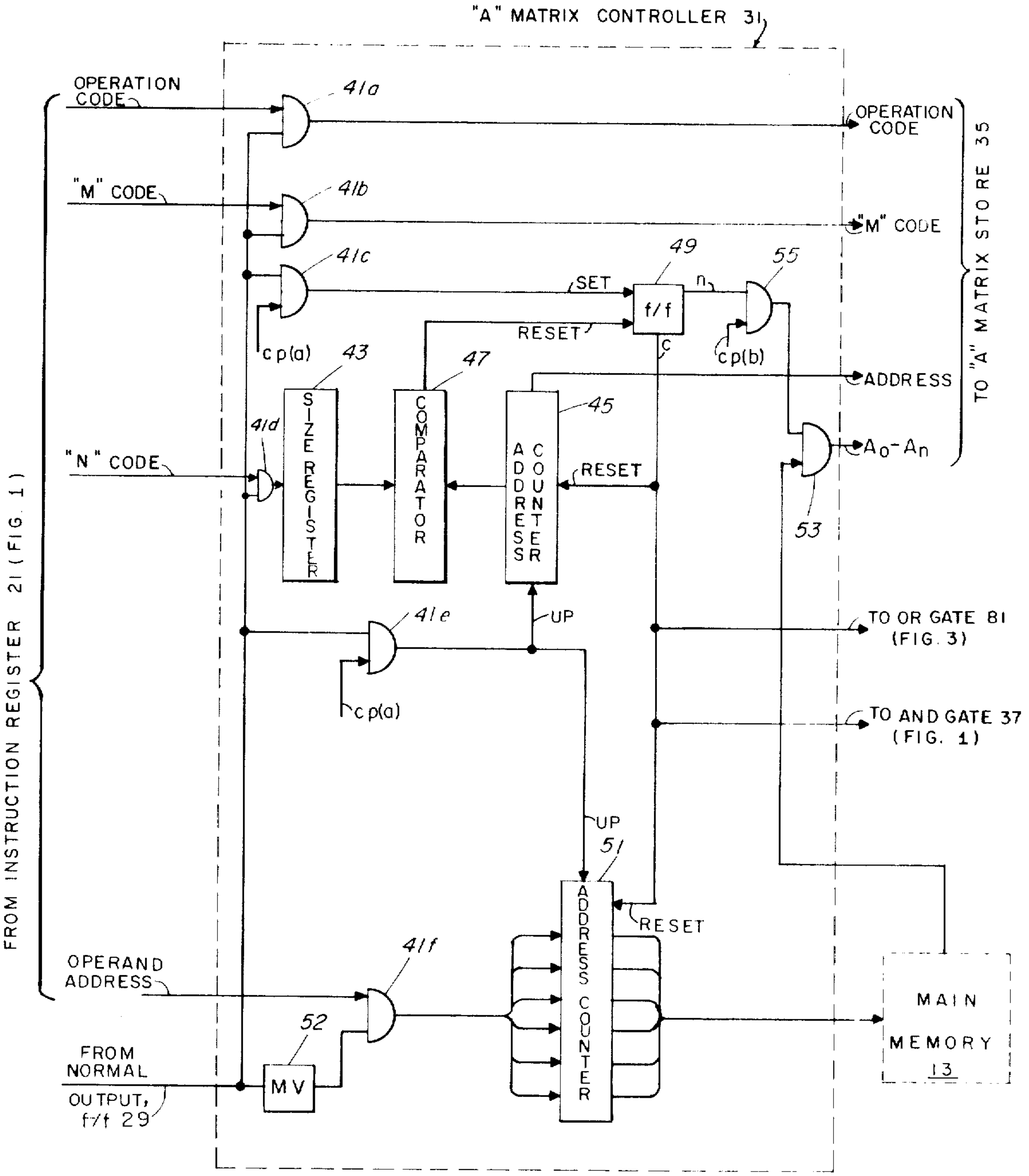
FIG. 2 is a block diagram illustrating a preferred arrangement of the contemplated processor to store array and associated operation codes and FIG. 3 is a block diagram illustrating a preferred arrangement of the contemplated processor, showing in particular the way in which the elements of a stored array may be combined with the elements of a second array to effect a "matrix multiply" routine.

When the instruction word out of the main memory 13 contains an "M" code in the "M" code field, AND gate 27 is inhibited. The operand address code in that instruction word is, therefore, not applied to the "$C_0$" address counter 23 and the contents of the "$C_0$" address counter 23 remain as the address in the main memory 13 at which the first partial result, "$C_0$" will be stored. An "N" code in the "N" code field sets a normally reset flip flop 29. Upon setting of the flip flop 29, an "A" matrix controller 31 is enabled and a "B" matrix controller 33 is disabled. Therefore, the various codes, i.e., operation code, the "M" and the "N" codes and operand address code, in the instruction word in the instruction register 21 are effectively connected to the "A" matrix controller 31. This controller, in a manner to be shown hereinafter in connection with the discussion of FIG. 2, is effective to actuate an "A" matrix store 35. As indicated, the operation code in the instruction word in the instruction register 21 and the "M" code in such word are transferred to predetermined fields in the "A" matrix store 35. The operand address code in the instruction register 21 (which code here indicates the address in the main memory 13 of the first element "$A_0$" of an "A" matrix) is processed by the "A" matrix controller 31 so as to transfer "$A_0$ " from the main memory 13 to the first address in the "A" matrix store 35. The "A" matrix controller 31 then transfers, in succession, the remaining elements, $A_1$ — $A_n$, in the "A" matrix to successive addresses in the "A" matrix store 35.

During the time the "A" matrix controller 31 operates to load the "A" matrix store 35, the program counter 15 is inhibited by reason of the absence of an enabling signal on and AND gate 37. When the "A" matrix store 35 is fully loaded, AND gate 37 is enabled so that the program counter 15 is then responsive to the next following clock pulse from the clock pulse generator 17 to change the instruction word address in the main memory 13. The next following instruction word is, therefore, passed to the instruction register 21. This instruction word contains an "N" code indicating that a matrix processing operation is required. The presence of this "N" code then resets flip flop 29, thereby effectively connecting the instruction register 21 to the B matrix controller 33 and effectively disconnecting the A matrix controller 31. For reasons to be discussed hereinafter in connection with the discussion of FIG. 3, the B matrix controller 33 then is effective: (a) to inhibit operation of the program counter 15; (b) to connect the operation code then in the instruction register 21 with the arithmetic units 19; (c) to extract from the main memory 13 the elements of the "B" matrix; (d) to synchronize extraction of the elements of the "A" matrix from the "A" matrix store 35 with such "B" elements; (e) to actuate the arithmetic units 19 to produce a "C" matrix; (f) to store the elements of the "C" matrix in predetermined addresses in the main memory 13; and finally, (g) to enable AND gate 37, thereby to actuate program counter 15 to continue with the program.

Referring nwo to FIG. 2 it may be seen that the "A" matrix controller 31 accepts the various codes from the instruction register 21 only when AND gates 41*a*, 41*b*, 41*c*, 41*d*, 41*e*, 41*f* are enabled by reason of the flip flop being "set." Thus, the operation code associated with the "A" matrix is passed through AND gate 41*a* directly to the "A" matrix store 35. In like manner, the "M" code is passed through AND gate 41*b* to the "A" matrix store 35. The "N" code, upon passing through AND gate 41*d*, is impressed upon a "size" register 43. The "N" code (which here represents the number of elements in the "A" matrix) is, therefore, stored in the size register 43. An address counter 45 is counted up by one for each c.p. (a) occurring after AND gate 41*e* is enabled. When the cumulative count in such counter equals the number in the size register 43, a comparator 47 is actuated as shown to produce an output signal to the reset terminal of a flip flop 49. The latter element, having been set by the first c.p. (a) through AND gate 41*c*, is then caused to reset.

The operand address code out of the instruction register 21 is passed through AND gate 41*f* and to an address counter 51. AND gate 41F is momentarily enabled at the beginning of the "A" cycle of operation by a signal out of a monostable multivibrator 52. Address counter 51 is, therefore, initially loaded with the address in the main memory 13 of the operand "$A_0$". "$A_0$" is then extracted from the main memory 13 and applied to an AND gate 53 as shown. The AND gate 53, in turn, is enabled when flip-flop 49 is set and a c.p. (b) exists. That is, the first c.p. (b) during the cycle of operation of the "A" matrix controller causes $A_0$ to be transferred from the main memory 13 to the lowest address in the "A" matrix memory 35. With AND gate 41e enabled, successive clock pulses, c.p. (a), therethrough cause address counter 45 and address counter 51 to count up. Therefore, it may be seen that each element of the "A" matrix is extracted from the main memory 13 and applied to a different address in the "A" matrix store 35 until the flip flop 49 is reset. When the flip flop 49 is reset address counters 45, 51 are reset to zero and a signal is passed from the complementary output of the flip flop 49 to the OR gate 81 (FIG. 3) and an enabling signal is passed to AND gate 37 (FIG. 1).

It may be seen therefore that in response to the first instru ction word containing an "N" code in its "N" code field the "A" matrix controller 31 is actuated to store the corresponding operation code and the corresponding "M" code in the "A" matrix store 35 and further to extract the elements of the "A" matrix from the main memory 13 and store such elements at successive addresses in the "A" matrix store 35.

When the "A" matrix controller 31 finishes its cycle of operation and passes an enabling signal to the AND gate 37 (FIG. 1), the program counter 15 then causes the next following instruction word in the program to be transferred from the main memory 13 to the instruction register 21. As noted hereinbefore, flip flip 29 then is caused to reset to enable the "B" matrix controller 33.

Figure 3:
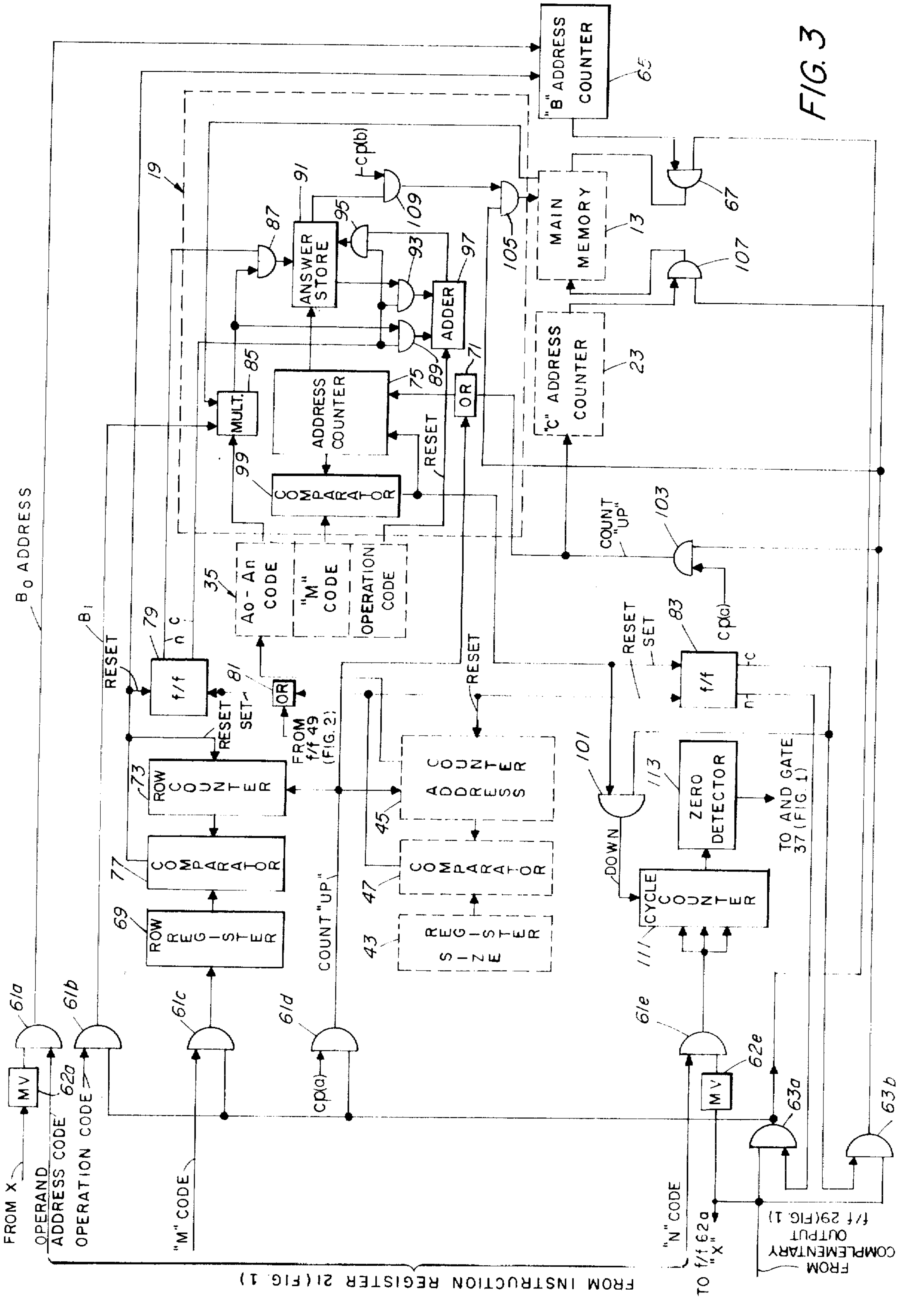

Before referring to FIG. 3, it should be noted that several elements shown in dotted outline in FIG. 3 are elements which have been shown in previous figures. These elements have been repeated in order to clarify the operation of the "B" matrix controller 33 and the arithmetic units 19. With the foregoing in mind, it may be seen that the "B" matrix controller 33 includes a number of AND gates **61*a*, 61*b*, 61*c*, 61*d*, 61*e* whose function is to permit the various codes from the instruction register 21 (FIG. 1) to pass to the operating elements of the "B" matrix controller 33 and the arithmetic units 19. Also included in the "B" matrix controller 33 is a pair of AND gates 63*a*, 63*b* which function in a manner to be described hereinafter. Suffice it to say here that at the beginning of the "B" operation AND gate 63*a* is enabled and AND gate 63*b* is inhibited. With such a condition of the AND gates 63*a*, 63*b*, AND gate 67 and AND gates 61b through 61*d* are enabled. Also AND gate 61*a* and 61*e* are momentarily enabled by reason of the operation of monostable multivibrators 62*a*, 62*e*. It may be seen, therefore, that at this time the operand address code in the instruction register 21 is passed directly to a "B" address counter 65. That counter, upon being loaded, selects address "$B_o$" in the main memory 13 because AND gate 67 is also then enabled. Element "$B_o$" in the "B" matrix is applied to the arithmetic units 19 as shown. The enabling of AND gate 61*b* permits the operation code in the instruction register 21 (FIG. 1) to be passed to the arithmetic units 19. The enabling of AND gate 61c permits the "M" code in the third instruction word in the instruction register 21 (FIG. 1) to be passed to a row register 69 thereby storing the "M" code in such register. The enabling of AND gate 61d permits a clock pulse c.p. (a) to be passed to a row counter 73, to address counter 45 (located in the "A" matrix controller 31) and, through an OR gate 71, to an address counter 75 (located in the arithmetic units 19). Each one of the counters just mentioned is initially empty. The contents of the row register 69 and the row counter 73 are impressed on a comparator 77. The output of the comparator 77 is connected to the reset terminal of the row counter 73, the reset terminal of a flip flop 79 and the "B" address counter 65. It may be seen, therefore, that the "B" address counter does not change with each c.p. (a) but rather counts up by one each time the output signal from the comparator 77 indicates that the contents of the row register 69 and the row counter 73 are equal. Further, it may be seen that, when the count in the row counter 73 equals the count in the row register 69, the row counter 73** is reset to its initial count, i.e., empty.

The address counter 45, in response to each c.p. (a) selects a different one of the "A" codes previously stored in the "A" matrix store 35 for application to the arithmetic units 19. The size register 43 and the comparator 47 cooperate with the address counter 45 to produce a reset signal whenever the count in the address counter 45 equals the previously stored count in the size register 43. Such reset signal returns the address counter 45 to its initial state, i.e., empty. The signal out of the comparator 47 is also passed through an OR gate 81 to the set terminal of the flip flop 79 and also to the reset terminal of a flip flop 83. Assuming the number of clock pulses required to produce an output signal out of comparator 47 to be greater than the number of clock pulses required to produce an output signal from the comparator 77, the output signal from the former comparator, on passing through OR gate 81, always sets flip flop 79.

The "M" code and the operation code in the "A" matrix store 35 are applied directly to the arithmetic units 19. Those units here include a multiplier 85 to which the elements of the "A" codes (from the "A" matrix store 35) and the elements of the "B" codes (from the main memory 13) are applied. The output of the multiplier 85 is connected to AND gates 87 and 89. The former AND gate is enabled when flip flip 79 is in its "set" condition and the latter is enabled as shown when flip flop 79 is in its "reset" condition. With AND gate 87 enabled successive products out of the multiplier 85 are passed to an answer store 91. Address counter 75 selects the address in the answer store 91 for successive products from the multiplier 85. It follows, then, that there the first three partial products (which will be shown hereinafter to be $A_o \times B_o$; $A_1 \times B_0$ ; and $A_2 \times B_o$) are stored in successive addresses in the answer store 91. When flip flop 79 is reset, AND gates 93, 95 between the answer store 91 and an arithmetic unit, here an adder 97, are enabled along with AND gate 89 and AND gate 87 is inhibited. It follows, from all of the foregoing, that the partial results in the answer store 91 are added to the next set of products out of the multiplier 85 and a new partial result is returned to the answer store 91. The address counter 75 recycles as these new partial results are formed to select the address for each such result as it is produced by the adder 97.

Each time the count in the address counter 75 equals the "M" code in the "A" matrix store 35, a comparator 99 produces a signal which is applied: (a) to the reset terminal of the address counter 75; (b) to the set terminal of the flip flop 83 and (c) to an AND gate 101. Each such reset signal returns the address counter 75 to its initial condition, i.e., empty. The signals on the set terminal of the flip flop 83 are without effect unless that element is in its reset condition. Thus, it may be seen that, until a signal is produced by the comparator 47, the just described routine is repeated by the "B" matrix controller and the arithmetic units 19. Each time all of the "A" codes have been extracted from the "A" matrix memory, comparator 47 resets the flip flop 83. When that flip flop is reset, AND gate **63*a* is inhibited and AND gate 63*b* is enabled to change the mode of operation of the "B" matrix controller from one of selecting and processing "A" and " B" elements to one of transferring partial results to the main memory 13. Thus, when AND gate 63*b* is enabled AND gates 103, 105, 107 also are enabled, to permit the transfer of the partial results in the answer store 91 to the main memory 13. Thus, with the address counter 75 empty, the first following c.p. (b) applied to an AND gate 109 is effective to transfer the first partial product (which is now "$C_0$") from the answer store 91 to address "$C_0$" in the main memory 13. With AND gate 103 enabled, the next occurring c.p. (a) is passed to the "C" address counter 23 and, through OR gate 71, to the address counter 75, thereby causing those counters to count up one. The partial product ("$C_1$") at the address in the answer store 91 determined by the count in the address counter 75 is therefore passed through an AND gate 109 and AND gate 105 to the address in the main memory 13 determined by the new count of $C_0$ address counter 23. The transfer process continues until the count in the address counter 75 corresponds to the "M" code in the "A" matrix store 35. The comparator 99 then produces a signal to set the flip flop 83. With AND gate 101 enabled, the signal out of the comparator 99 is passed to a cycle counter 111, causing that element to count down one. The initial contents of the cycle counter 111 are the count determined by the "N" code of the third instruction program word in the applied instruction register 21 (FIG. 1). The contents of the cycle counter 111 are monitored by a zero detector 113, which produces an output signal when the cycle counter 111 is empty. The output of the zero detector 113 is connected to the AND gate 37 (FIG. 1) thereby to enable the program counter when the cycle counter 111 is empty. It may be seen therefore that the "B" matrix controller 33 and the arithmetic units 19 recycle until the cycle counter 111** is empty, indicating completion of the desired processing. The operation of the contemplated computer will now be described by showing how an exemplary "matrix multiply" is effected. Thus, consider the two matrices:

$$A = \begin{bmatrix} A_0 & A_3 & A_6 \\ A_1 & A_4 & A_7 \\ A_2 & A_5 & A_8 \end{bmatrix}$$

and $$B = \begin{bmatrix} B_0 & B_3 & B_6 \\ B_1 & B_4 & B_7 \\ B_2 & B_5 & B_8 \end{bmatrix}$$

where it is desired to multiply and obtain a matrix:

$$C = \begin{bmatrix} C_0 & C_3 & C_6 \\ C_1 & C_4 & C_7 \\ C_2 & C_5 & C_8 \end{bmatrix}$$

The problem may be generally expressed as:

$$C = f\,(A,\,B) \qquad \text{(Eq. 1)}$$

where (f) is any function. Here the problem is specified in the higher order language, APL, as

$$C = A + \times B. \qquad \text{(Eq. 2)}$$

The instruction sequence, required according to this invention, to solve Eq. 2 is:

| Instruction Word | Operation Code | M Code | N Code | Operand Address (Main Memory) |
|---|---|---|---|---|
| 1 | LOAD | NONE | NONE | $C_0$ |
| 2 | ADD | 3 | 9 | $A_0$ |
| 3 | MULTIPLY | 3 | 3 | $B_0$ |

where a. the "M" code in instruction words 2 and 3 represents the number of rows in the "A" matrix;

b. the "N" code in word No. 2 represents the number of elements in the "A" matrix; and, c. the "N" code in word No 3 represents the number of columns in the "B" matrix.

When instruction word No. 1 is read out of the main memory 13, the address of $C_0$ is impressed on the "$C_0$" address counter 23. However, because AND gate 107 is inhibited, the loading of the "$C_0$" address counter 23 has no effect, at this time, on the computer. That is, the address in the main memory 12 of the first element, $C_0$, of the C matrix is simply held until needed. The second instruction word, being the first to contain an "N" code, enables the "A" matrix controller 31 and inhibits the "B" matrix controller 33. As pointed out hereinbefore, the program counter 15 is then inhbiited and the "A" matrix controller 31 operates to:

1. Transfer the operation code (ADD) and the "M" code (3) to the "A" matrix store 35;

2. Address the main memory 13 to transfer $A_0$ therefrom to the first address in the "A" matrix store 35;

3. Increment the address in the main memory 13 to extract therefrom successive elements ($A_1$ through $A_8$) of the "A" matrix and to transfer each element to a successively higher address in the "A" matrix store 35; and, 4. Upon completion of the transfer of all nine elements of the "A" matrix from the main memory 13, enabling the program counter 15 to transfer the third instruction word from the main memory 13 to the instruction register 21 and preparing (by setting flip flop 79 through OR gate 81) the "B" matrix controller for operation.

At the end of this portion of the routine, then, the operation code "ADD," the "M" code "3" and the elements "$A_0$" through "$A_8$" are stored in the "A" matrix store at known addresses therein. The "C" address counter 23 still holds the address "$C_0$" and the size register 43 still contains the "N" code "9."

The third instruction word into the instruction register 21 causes flip flop 29 to change state to enable the "B" matrix controller 33 and inhibit the "A" matrix controller 31. The following then occurs:

1. The operand address "$B_0$" is applied to the "B" address counter 65 so that the first element of the "B" matrix is extracted from the main memory 13 and applied to the arithmetic units 19;

2. $A_0$ is extracted from the "A" matrix store 35 and applied to the arithmetic units 19;

3. The operation code "MULTIPLY" in the instruction register 21 is applied to the arithmetic units 19;

4. The partial result $A_0 \times B_0$ is stored in the answer store 91 at the lowest address therein.

5. Address counters 45, 75 are stepped up one to select $A_1$ from the "A" matrix store 35, the partial result $A_1\ B_0$ and to store such result in the next highest address in the answer store 91. The subroutine just described in repeated until the contents of the answer store 91 are:

| ADDRESS | PARTIAL RESULT |
|---|---|
| 0 | $A_0 \times B_0$ |
| 1 | $A_1 \times B_0$ |
| 2 | $A_2 \times B_0$ |

After these partial results are obtained, the comparator 77 having then produced a signal to reset flip flop 79 and to reset row counter 73 and the comparator 99 having then produced a signal to reset address counter 75, steps 1 through 5 are repeated except:

a. The "B" address counter 65 is incremented by one to transfer $B_1$ from the main memory 13 to the arithmetic units 19;

AND gates 87, 89, 93, 95 in the arithmetic units 19 are conditioned so as to connect the partial result out of the multiplier 85 and the partial result out of the answer store 91 to the adder 97 and to return the sum of such results to the answer store 91; and, c. address counter 45 is conditioned to extract $A_3$, $A_4$, $A_5$ in succession during the next following operational cycle of the row counter 73.

It follows, then, that the partial results in the answer store 91, upon completion of the second operational cycle of the row counter 73, are:

| ADDRESS | PARTIAL RESULT |
|---|---|
| 0 | $A_0 \times B_0 + A_3 \times B_1$ |
| 1 | $A_1 \times B_0 + A_4 \times B_1$ |
| 2 | $A_2 \times B_0 + A_5 \times B_1$ |

The operational cycle of row counter 73 is repeated for a third time to multiply $A_6$, $A_7$ and $A_8$ with $B_2$. At the end of such third cycle of operation of the row counter 73 the contents of the answer store 91 are:

| ADDRESS | PARTIAL RESULT |
|---|---|
| 0 | $A_0 \times B_0 + A_3 \times B_1 + A_6 \times B_2$ |
| 1 | $A_1 \times B_0 + A_4 \times B_1 + A_7 \times B_2$ |
| 2 | $A_2 \times B_0 + A_5 \times B_1 + A_8 \times B_2$ |

It will be recognized that the partial result at each address in the answer store 91 is now equal, respectively, to the first three elements ($C_0$, $C_1$, $C_2$) of the desired "C" matrix and that the address counter 45 has been counter up to a count equal to the count in the size register 43. Therefore:

a. flip flop 83 is reset, AND gates 101, 103, 105 and 107 are enabled and AND gates **61*a* through 61*e* (along with AND gate 67) are disabled; and b. AND gates 87, 89, 93 and 95 in the arithmetic units 19 are conditioned to connect the multiplier 85 directly to the answer store 91**.

The "B" matrix controller 33 is, therefore, in condition to: (a) transfer the partial results ($C_0$; $C_1$; $C_2$) in the answer store 91 to the main memory 13; (b) decrement the cycle counter 111 indicating that $C_0$, $C_1$ and $C_2$ have been calculated and transferred; and (c) prepare the arithmetic units 19 for another operational cycle.

Thus, the initial count in the "C" address counter 23 (which count it will be remembered is the count determined by the operand address in the first instruction word) selects the address in the main memory 13 to which $C_0$ is to be transferred from the answer store 91. On the next c.p. (b), then, $C_0$ is transferred through AND gate 109 to such address. The "C" address counter 23 and the address counter 75 are then incremented by the next c.p. (a) to select the next highest address in the answer store 91 and the main memory 13. $C_1$ is, therefore, transferred to the next highest address in the main memory 13. The two counters are again incremented and $C_3$ is transferred. The comparator 99 then is caused (by reason of the equality in the count of the address counter 75 with the "M" code in the "A" matrix store 35 having been attained) to set flip flop 83 and decrement cycle counter 111. The setting of flop flop 83 returns the "B" matrix controller to its initial condition except that the "B" address counter 65 remains at its last count, i.e., ready to extract $B_3$ from the main memory 13. At the completion of the processing portion of such cycle, the contents of the answer store 91 are

| ADDRESS | PARTIAL RESULT |
|---|---|
| 0 | $A_0 \times B_3 + A_3 \times B_4 + A_6 \times B_5$ |
| 1 | $A_1 \times B_3 + A_4 \times B_4 + A_7 \times B_5$ |
| 2 | $A_2 \times B_3 + A_5 \times B_4 + A_8 \times B_5$ |

It will be recognized that the partial result at each address in the answer store 91 is now equal, respectively, to the second three elements ("$C_3$"; "$C_4$"; $C_5$ ") of the desired "C" matrix, that the count in the address counter 45 again equals the count in the size register 43 and that the "C" address counter 23 is addressing the address in the main memory 13 for element "$C_3$." Therefore, during the transfer cycle, "$C_3$", "$C_4$" and "$C_5$" are transferred to their proper addresses in the main memory 13. At the end of the transfer cycle, cycle counter 111 is again decremented. As before, the "B" address counter 65 and the "C" address counter 23 then hold the count corresponding to, respectively, the address of the next following "B" and "C" elements.

When the processing and transfer cycle is repeated the last three elements ("$C_6$ "; "$C_7$"; "$C_8$") of the "C"matrix are obtained and transfered to their proper addresses in the main memory 13. Thus, at the completion of the processing portion of such cycle, the contents of the answer store 91 are:

| ADDRESS | PARTIAL RESULT |
|---|---|
| 0 | $A_0 \times B_6 + A_3 \times B_7 + A_6 \times B_8$ |
| 1 | $A_1 \times B_6 + A_4 \times B_7 + A_7 \times B_8$ |
| 2 | $A_2 \times B_6 + A_5 \times B_7 + A_8 \times B_8$ |

When the cycle counter 111 is now decremented it becomes empty and the zero detector 113 is cuased to produce an enabling signal to cause the program counter 15 to address the main memory 13 and extract therefrom a new instruction word. The "C" matrix is then stored in the memory 13 at known addresses and is availble as desired.

Having described this invention in terms of its application to the problem of providing controls for a digital computer to permit such computer to perform a "matrix multiply" process in response to three simple instruction words, it will be apparent that the concepts of this invention may be followed to process arrays other than those shown. Thus, it will be obvious to one of skill in the art that the size and dimensions of two matrices to be processed may be changed at will within wide limits so long as their inner dimensions are, as required in the processing of any two matrices, the same. Further, it would be obvious that the concepts of this invention do not require that the controllers and arithmetic units be exactly as shown and described. Thus, it is evident that the counter, comparator and register arrangements disclosed to control the different portions of the operational cycle of the disclosed processor could be replaced by counters, similar to the cycle counter, so arranged to count down to zero to indicate completion of the different portions of the operational cycle. Similarly, the arithmetic units may be replaced by any other known arithmetic or logic units to perform operations other than "matrix multiply." In this connection it should be noted that a processor built according to the concepts of the invention is limited only by the requirement that the "M" and "N"codes, taken together, define the arrays to be processed. Because this is so, the concept unederlying the disclosed processor may be used to process, without compiling, arrays expressed in the higher order language "APL," or to form "outer products" (meaning to form a two-dimensional matrix by processing two vectors or to perform "element-by-element" processing of two vectors. It is felt, therefore, that this invention should not be limited to its disclosed embodiment but rather should be limited only by the spirit and scope of the appended claims.

What is claimed is:

1. In a digital computer wherein the element of a plurality of arrays of digital numbers are stored at known addresses in its memory, such computer being actuated by a sequence of instruction words to process selected ones of such arrays, each one of the instruction words thereof including an operation code, an operand address code and an array dimension code, a processor for combining the elements of selected ones of such arrays, such processor comprising:

a. an array store having a plurality of addresses;

b. array store addressing and actuating means, responsive to the operand address code and to the array dimension code in a first one of the instruction words, for transferring each element of a first array of digital numbers from its known address in the memory to a known address in the array store and for storing the operation code and at least a portion of the array dimension code of the first one of the instruction words at different known addresses in the array store;

c. array element selecting means, responsive to the portion of the array dimension code in the array store and responsive to the operand address code and to the array dimension code in a second one of the instruction words, for sequentially retrieving the elements of the first array of digital numbers in a first order from the array store and for sequentially retrieving the elements of a second array of digital numbers in a second order from the memory; and, d. combining means, responsive to the operation code stored in the array store and to the operation code in the second instruction word, for combining the elements of the first and second array of digital numbers as such numbers are retrieved.

2. In a digital computer for processing matrices of digital numbers, the elements of each one of such matrices being stored at known addresses in the computer's memory, such computer being responsive to an operand address code in each one of a sequence of instruction words to select the address of the first element in each one of the matrices to be processed, each one of the instruction words further including an operation code and a matrix dimension code to define the number of rows, columns and elements in each one of the matrices, a processor to multiply selected elements in a selected pair of such matrices, such processor comprising:

a. means, responsive to the operand address code and to the matrix dimension code in a first instruction word, for transferring the elements of a first one of the matrices from the computer's memory to successive addresses in a matrix store;

b. means, responsive to the operation code and to the matrix dimension code in the first instruction word, for storing such operation code and matrix dimension code;

c. means responsive to the operand address code in a second instruction word, for retrieving the first element in a second one of the matrices from the computer's memory, d. arithmetic means for multiplying selected elements in the first and the second one of such matrices to derive partial results, each one of such results being a part of an element in a resulting matrix; and e. matrix element selecting means, responsive to the matrix dimension code in the first and the second instruction word for successively impressing the elements in the first column of the first one of the matrices in the matrix store and the first element in the second one of the matrices of the arithmetic means and then the elements in each successive column of the first one of the matrices with a successive one of the elements in the second one of the matrices.

3. A processor as in claim 2 having additionally, answer storage means, responsive to the matrix dimension code in the first one of the instruction words, for storing each partial result out of the arithmetic means at a known address in such storage means.

4. A processor as in claim 3 having additionally, adder means in the arithmetic means for adding the partial result at each known address in the answer storage means to predetermined ones of the partial results out of the multiplying means.

5. A processor as in claim 4 having additionally:

a. means, responsive to the matrix dimension code in the first and the second instruction words, for determining when the partial results in the answer storage means correspond to elements in the resulting matrix;

b. means for then transferring each one of the elements in the answer storage means to a known address in the computer's memory; and, c. means for repeating the multiplication and adding of elements in the first and the second matrix and transfer of elements in the resulting matrix until all of the elements of such matrix are transferred to known addresses in the computer'memory.

6. In a processor for a digital computer adapted to combine, in response to three successive instruction words retrieved from a memory along with the elements of a first and a second matrix to be combined to form a third matrix, each one of such words including an operation code, an operand address code and a matrix control code to control the operation of the processor and the digital computer, the improvement comprising:

a. address counter means for the third matrix, responsive to the matrix control code in the first instruction word, for receiving the operand address code in such word;

b. first matrix control and storage means, responsive to the matrix control code in the second instruction word, for inhibiting operation of the third matrix address counter means and for storing the elements of the first matrix, the operation code in the second instruction word and a first coded signal representative of a first selected dimension of the first matrix; and c. processor control means, responsive to the operation code, the operand address code and the matrix control code in the third instruction word and to the codes stored in the first matrix control and storage means, for enabling the third matrix address counter means for combining the elements of the first and the second matrix to form, successively, subgroups of the elements of the third matrix and to store each successively formed subgroup in said memory.

* * * * *

UNITED STATES PATENT OFFICE
CERTIFICATE OF CORRECTION

Patent No. 3,794,984 Dated Feb. 26, 1974

Inventor(s) Alan J. Deerfield & Stanley Nissen

It is certified that error appears in the above-identified patent and that said Letters Patent are hereby corrected as shown below:

Column 1, line 32, change from "Notatio" to --notation--

Column 1, line 55, change from "itis" to --it is--

Column 3, line 66 change "and" to --an--

Column 4, line 24 change from "nwo" to --now--

Column 4, line 47, change from "41F to --41f--

Column 7 equation 1 change from "($A_1$ B)" to --(A,B)--

Column 9, line 43 change from "counter" to --counted--

Column 10, line 45, change from "cuased" to --caused--

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*